(12) United States Patent
Ishino

(10) Patent No.: US 7,021,773 B2
(45) Date of Patent: Apr. 4, 2006

(54) IMAGE PROJECTOR APPARATUS HAVING AN ELEVATION ADJUSTMENT MECHANISM AND LINKED LENS COVER

(75) Inventor: Hirohisa Ishino, Kanagawa (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 10/486,146

(22) PCT Filed: Jun. 10, 2003

(86) PCT No.: PCT/JP03/07376

§ 371 (c)(1),
(2), (4) Date: Feb. 6, 2004

(87) PCT Pub. No.: WO03/104893

PCT Pub. Date: Dec. 18, 2003

(65) Prior Publication Data

US 2005/0117129 A1    Jun. 2, 2005

(30) Foreign Application Priority Data

Jun. 10, 2002    (JP) .............................. 2002-168939

(51) Int. Cl.
G03B 21/14    (2006.01)
G03B 21/30    (2006.01)
H04N 5/64    (2006.01)
(52) U.S. Cl. ....................... 353/119; 348/794
(58) Field of Classification Search ................ 353/119, 353/70, 69, 100, 101, 122; 348/745, 785, 348/787, 794, 789; G03B 21/30
See application file for complete search history.

(56) References Cited

U.S. PATENT DOCUMENTS

| 5,605,390 A | * | 2/1997 | Brice et al. .................. 353/119 |
| 5,836,664 A | * | 11/1998 | Conner et al. ................. 353/70 |
| 6,604,831 B1 | * | 8/2003 | Prestigomo et al. ......... 353/119 |
| 2004/0041985 A1 | * | 3/2004 | Kimura et al. ................. 353/70 |

FOREIGN PATENT DOCUMENTS

| JP | 6-317845 | 11/1994 |
| JP | 2582651 | 7/1998 |
| JP | 2000-241874 | 9/2000 |
| JP | 2000-241875 | 9/2000 |

OTHER PUBLICATIONS

JP6-317845-A as translated by the Thomson corp. on Jun. 13, 2005.*
JP2582651-Y2 as translated by the Thomson corp. on Jun. 13, 2005.*

* cited by examiner

Primary Examiner—W. B. Perkey
Assistant Examiner—Andrew Sever
(74) Attorney, Agent, or Firm—Frommer Lawrence & Haug LLP; William S. Frommer; Darren M. Simon

(57) ABSTRACT

An image projection apparatus having an adjuster mechanism with a projecting member projecting from a bottom surface of the case to adjust the elevation angle of a projection lens and an opening/closing member located at a front surface of said projection lens for opening or closing the projection opening. The adjuster mechanism uses an electric motor to move the projecting member up and down. The opening/closing member is opened/closed using a linkage mechanism linked to the adjuster mechanism.

13 Claims, 7 Drawing Sheets

IMAGE PROJECTOR APPARATUS HAVING AN ELEVATION ADJUSTMENT MECHANISM AND LINKED LENS COVER

TECHNICAL FIELD

The present invention relates to an image projection apparatus provided with an adjuster for adjusting a degree of elevation of a projected image.

BACKGROUND ART

In liquid crystal projectors and other image projection apparatuses having video modulating means, an image projection apparatus provided with an adjuster for adjusting the degree of elevation of the apparatus in order to adjust the height of the projected image on the screen has been known. The adjuster is usually operated manually.

In an image projection apparatus provided with an adjuster, however, when adjusting the height of the projected image on the screen, it is necessary to tilt the image projection apparatus and view the image on the screen while adjusting the amount of the height of the adjuster, so there were the disadvantages that the operation was difficult and fine adjustment was hard.

Further, there was also the disadvantages that whenever the position of the screen was changed, adjustment of the degree of elevation of the image projection apparatus was necessary, a long time was needed for the settings for projecting the image onto the screen from the image projection apparatus, and also storage of the adjuster into the case was troublesome.

On the other hand, the projection lens of an image projection apparatus is an optical lens, so care must be taken so as not to scratch or dirty it. Therefore, many image projection apparatuses provide lens caps on the projection lenses for protection. For this reason, in order to project an image onto a screen from the image projection apparatus, detachment of the lens cap was necessary every time. On this point as well, there existed the disadvantages that a long time was needed for the settings and also storage of the adjuster into the case was troublesome.

DISCLOSURE OF THE INVENTION

An object of the present invention is to provide an image projection apparatus having an adjuster able to adjust the degree of elevation which can easily perform adjustment for projecting an image onto a screen and can easily return a projecting member or other elevation member to a return position (first position).

Another object of the present invention is to provide an image projection apparatus able to effectively protect the projection lens.

According to the first aspect of the present invention, there is provided an image projection apparatus comprising a case having a projection opening at a first side; a projection lens contained in said case and projecting an image through the projection opening of said case; an adjuster means having an elevation member, lifting said elevation member from a first position where a lower end of the elevation member does not contact a setting surface of the bottom of said case, through a second position where the lower end of said elevation member contacts the setting surface of said case and raises a first side of said case by using a bottom of said case on a second side facing the first side of said case as a fulcrum and starts generation of an elevation angle, to a third position for further enlarging the elevation angle over that of said second position, and adjusting the elevation angle of said projection lens in accordance with this elevation; a drive control means for controlling the drive of said adjuster means; an opening/closing member located at a front surface of said projection lens for opening or closing said projection opening; and a linkage means operating linked with said adjuster means to move said opening/closing member so as to open said projection opening during a period where said elevation member is moved from said first position to said third position by said drive control means to move said opening/closing member so as to close said projection opening when said elevation member returns from said third position to said first position.

According to a second aspect of the present invention, there is provided an image projection apparatus comprising a case having a projection opening at a first side; a projection lens contained in said case and projecting an image through the projection opening of said case; an adjuster means having an elevation member, lifting said elevation member from a first position where a lower end of the elevation member does not contact a setting surface of the bottom of said case, through a second position where the lower end of said elevation member contacts the setting surface of said case and raises a first side of said case by using a bottom of said case on a second side facing the first side of said case as a fulcrum and starts generation of an elevation angle, to a third position for further enlarging the elevation angle exceeding that of the second position and adjusting the elevation angle of said projection lens in accordance with this elevation; a drive control means for controlling the drive of said adjuster means; and elevation instruction buttons provided on a top surface or a side surface of said case at a second side of said case in the vicinity of said fulcrum and instrucing elevation of said elevation member.

According to the third aspect of the present invention, there is provided an image projection apparatus comprising a case having a projection opening on a first side; a projection lens contained in said case and projecting an image through the projection opening of said case; an adjuster means having an elevation member, lifting said elevation member from a first position where a lower end of the elevation member does not contact a setting surface of the bottom of said case, through a second position where the lower end of said elevation member contacts the setting surface of said case and raises the first side of said case by using a bottom of said case on a second side facing the first side of said case as a fulcrum, and starts generation of an elevation angle, to a third position for further enlarging the elevation angle exceeding that of the second position, and adjusting the elevation angle of said projection lens in accordance with this elevation; a drive control means for controlling the drive of said adjuster means; a position detecting means for detecting the elevation position of said elevation member; and a storage means for storing the adjusted or set elevation angle or the elevation position of said elevation member, wherein said drive control means controls the drive of said adjuster means with reference to a detected value of said position detecting means so that it returns to the elevation angle or the elevation position of said elevation member stored in said storage means.

BRIEF DESCRIPTION OF THE INVENTION

BEST MODE FOR WORKING THE INVENTION

Below, an explanation will be given of an embodiment of an image projection apparatus of the present invention with reference to the drawings.

Figure 1:
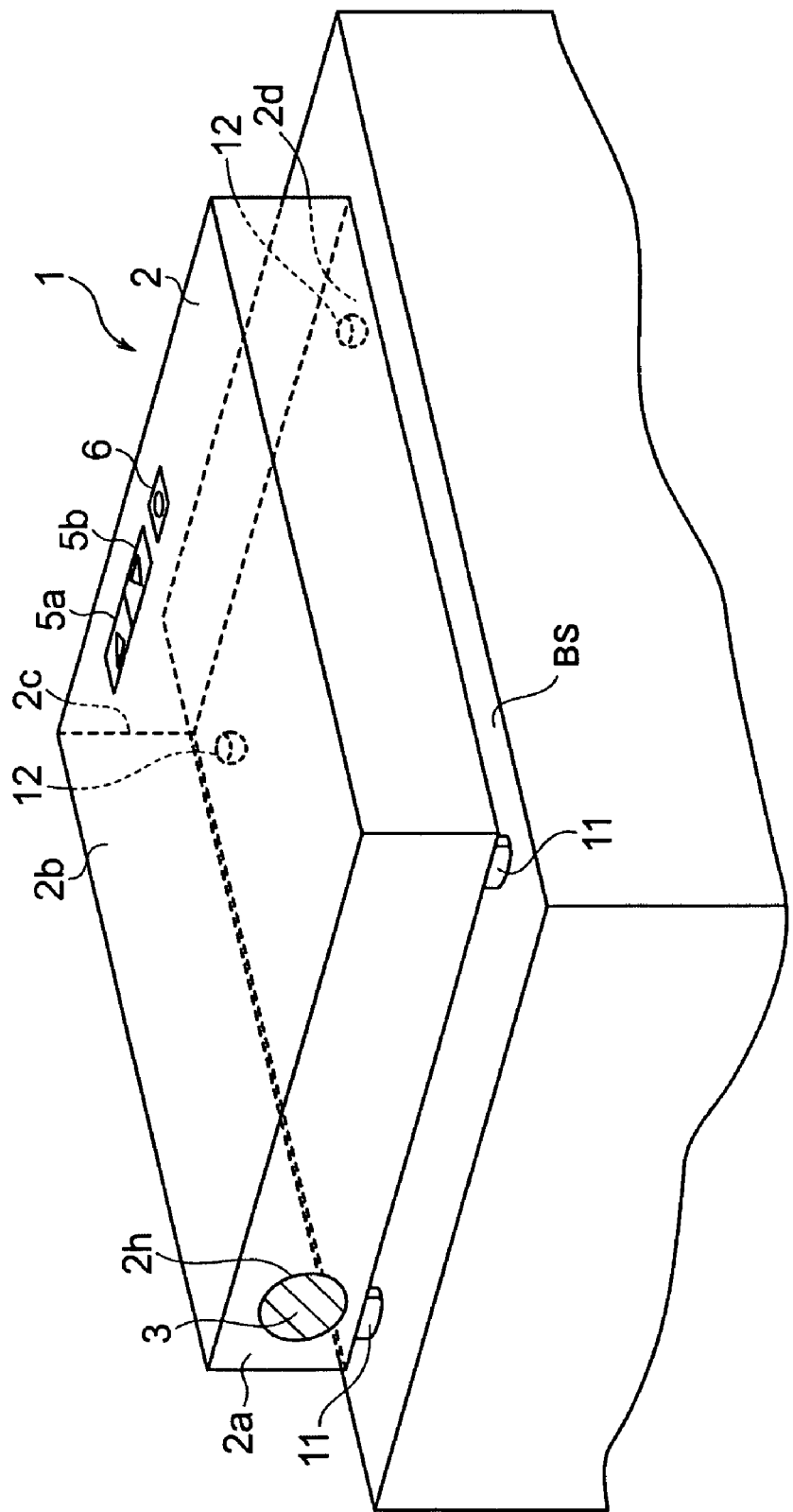
FIG. 1 is a perspective view of the appearance of an image projection apparatus according to an embodiment of the present invention.
Figure 2:
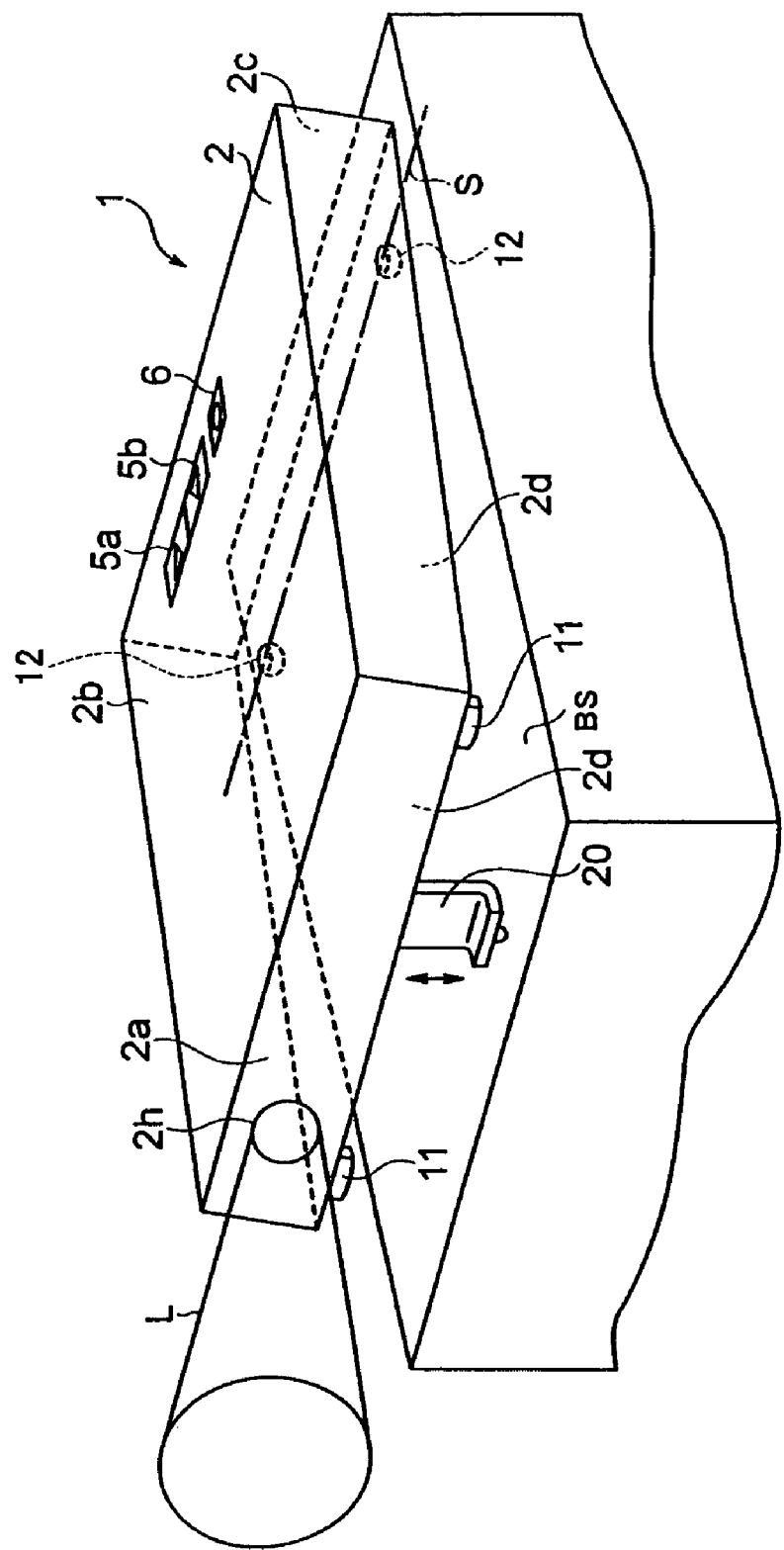
FIG. 2 is a perspective view of a state where the image projection apparatus projects an image.

FIG. 1 is a perspective view of the appearance of an image projection apparatus according to an embodiment of the present invention. FIG. 2 is a perspective view of a state where an image projection apparatus 1 projects an image.

As shown in FIG. 1, the image projection apparatus 1 is placed on a desk or other base BS corresponding to the setting surface of the present invention. A front surface 2a of a case 2 is provided with a projection opening 2h. This projection opening 2h is opened or closed by an opening/closing plate 3.

A top surface 2b of the case 2 is provided with two elevation instruction buttons 5a and 5b and a power switch 6. These elevation instruction buttons 5a and 5b and the power switch 6, from the viewpoint of operability, are arranged in the vicinity of a back surface 2c of the case 2 where there is a little position fluctuation even by the elevation angle control explained later.

A bottom surface 2d of the case 2 is provided with two support members 11 at the front surface 2a side. The back surface side 2c is provided with support members 12. The case 2 is supported at 4 points by these support members 11 and 12. A clearance is formed between the base BS and the bottom surface 2d of the case 2.

As shown in FIG. 2, the image projection apparatus 1 has a projecting member 20 serving as the elevation member of the present invention. The projecting member 20 can be elevated (moved up and down) between an accommodation position inside the case 2 as an example of a first position (return position) of the elevation member of the present invention and a position where the lower end of the projecting member 20 abuts against the base BS and the elevation angle for inclining the case 2 starts to be generated as a second position of the present invention and further a third position where the projecting member 20 projectes from the bottom surface 2d of the case 2 and the elevation angle of the case 2 becomes larger up to the maximum elevation angle. Note that the accommodation position does not have to be a position where the entire projecting member 20 is accommodated in the case 2 and may be a position where the lower end of the projecting member 20 does not abut against the base BS and does not generate an elevation angle.

When the projecting member 20 is located at the accommodation position inside the case 2, the image projection apparatus 1 is located in a horizontal direction parallel to the base BS. By the projection of the projecting member 20 from the bottom surface 2d of the case 2, the elevation angle of the image projection apparatus 1 changes in accordance with the projection amount thereof. The elevation angle of the projected image projected from the projection opening 2h onto the screen changes in accordance with the change of this elevation angle.

The elevation instruction buttons 5a and 5b are instruction buttons for adjusting the elevation position of the projecting member 20. For example, when the elevation instruction button 5b is depressed, during the depression, by the control operation of a control means 30 mentioned later, for example, the projecting member 20 moves downward from the accommodation position serving as the first position toward the second position where the elevation angle is generated. It projects from the bottom surface 2d of the case 2 and abuts against the base BS. When the projecting member 20 further continues to move downward, the bottom of the back surface (rear surface) 2c facing the front surface 2a of the case 2 tilts about the axis S using the axis S passing through the support members 12 as a fulcrum, whereby the front surface 2a provided with the projection opening 2h of the case 2 rises. When continuing to depress the elevation instruction button 5b, the projecting member 20 moves up to the third position where the maximum elevation angle is generated and stops.

On the other hand, when depressing the elevation instruction button 5a, the projecting member 20 rises toward the accommodation position. When the projecting member 20 rises from the base BS, the front surface 2a of the case 2 moves down. Finally, the inclination of the image projection apparatus 1 disappears. When the projecting member 20 further rises, it returns to the accommodation position.

The opening/closing plate 3 is moved linked with the elevation of this projecting member 20 to open the projection opening 2h. Image light L from the projection lens 38 (FIG. 4) is projected onto the screen through the projection opening 2h. Note that the opening/closing plate 3 is automatically opened or closed as will be mentioned later. The opening/closing structure of this opening/closing plate 3 and the internal structure of the image projection apparatus 1 will be explained later.

Figure 3A:
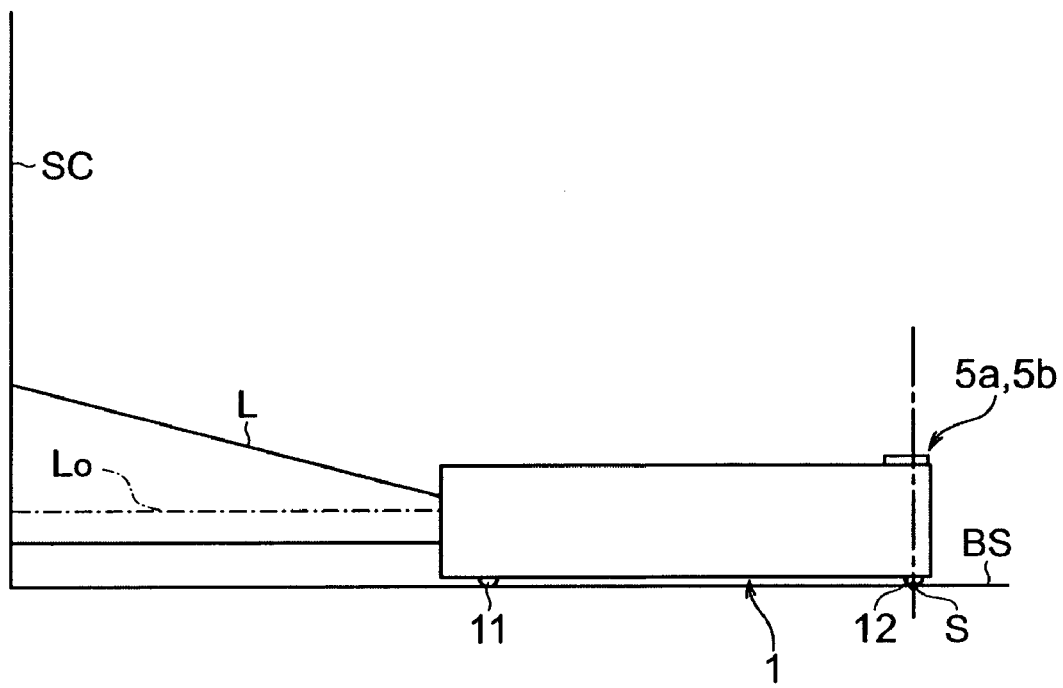
FIG. 3 is a view for explaining an example of adjustment work of an elevation angle of an image projection apparatus.
Figure 3B:
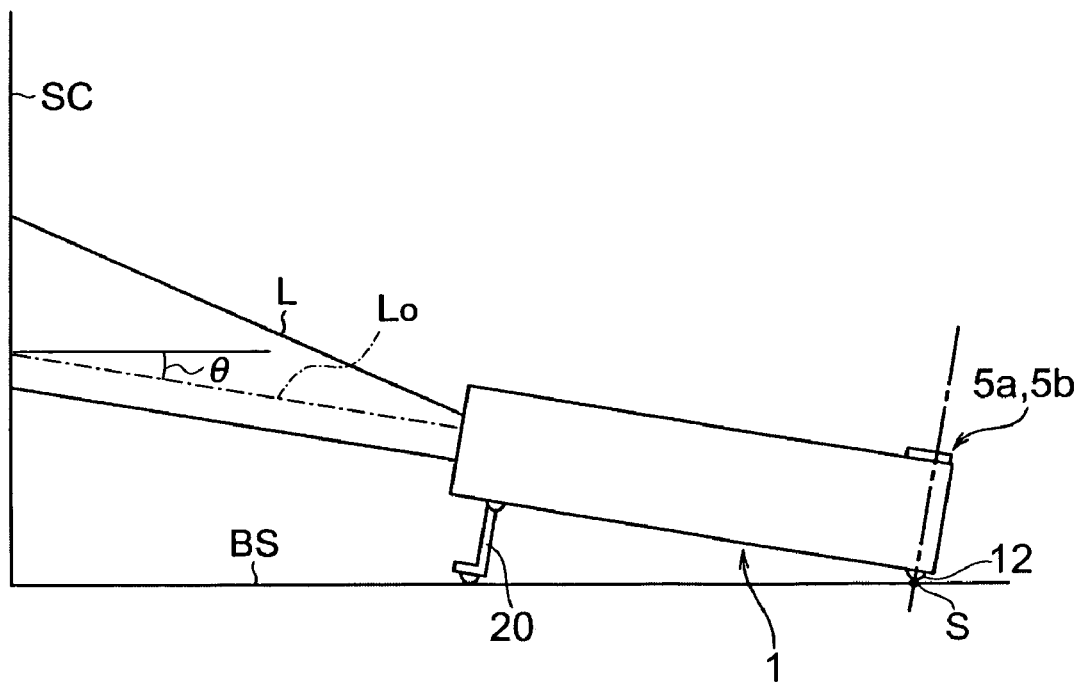

FIGS. 3A and 3B are views for explaining an example of the adjustment work of the elevation angle of the image projection apparatus 1.

As shown in FIGS. 3A and 3B, the elevation angle $\theta$ is defined as an angle formed by for example the base BS and a light axis $L_0$ of the projection lens using the base BS as the reference. Alternatively, it is defined as an angle formed by the base BS and the lowermost portion of the image light L. Note that the elevation angle $\theta$ is substantially equal to the inclination angle of the case 2 with respect to the base BS.

The height on the screen SC of the image light L projected from the image projection apparatus 1 is adjusted by operating the elevation instruction buttons 5a and 5b to adjust the elevation angle $\theta$.

The elevation instruction buttons 5a and 5b are located above the axis S passing through the support members 12, therefore the image projected on the screen SC can be viewed while operating the elevation instruction buttons 5a and 5b. Further, even if the image projection apparatus 1 is inclined, as seen from FIG. 3B, the positions of the elevation instruction buttons 5a and 5b do not move much at all, so the operability of the elevation instruction buttons 5a and 5b is very good.

In the same way as above, the power switch 6 is also located in the vicinity of the elevation instruction buttons 5a and 5b. The operability is good for the same reason as that for the elevation instruction buttons 5a and 5b.

Figure 4:
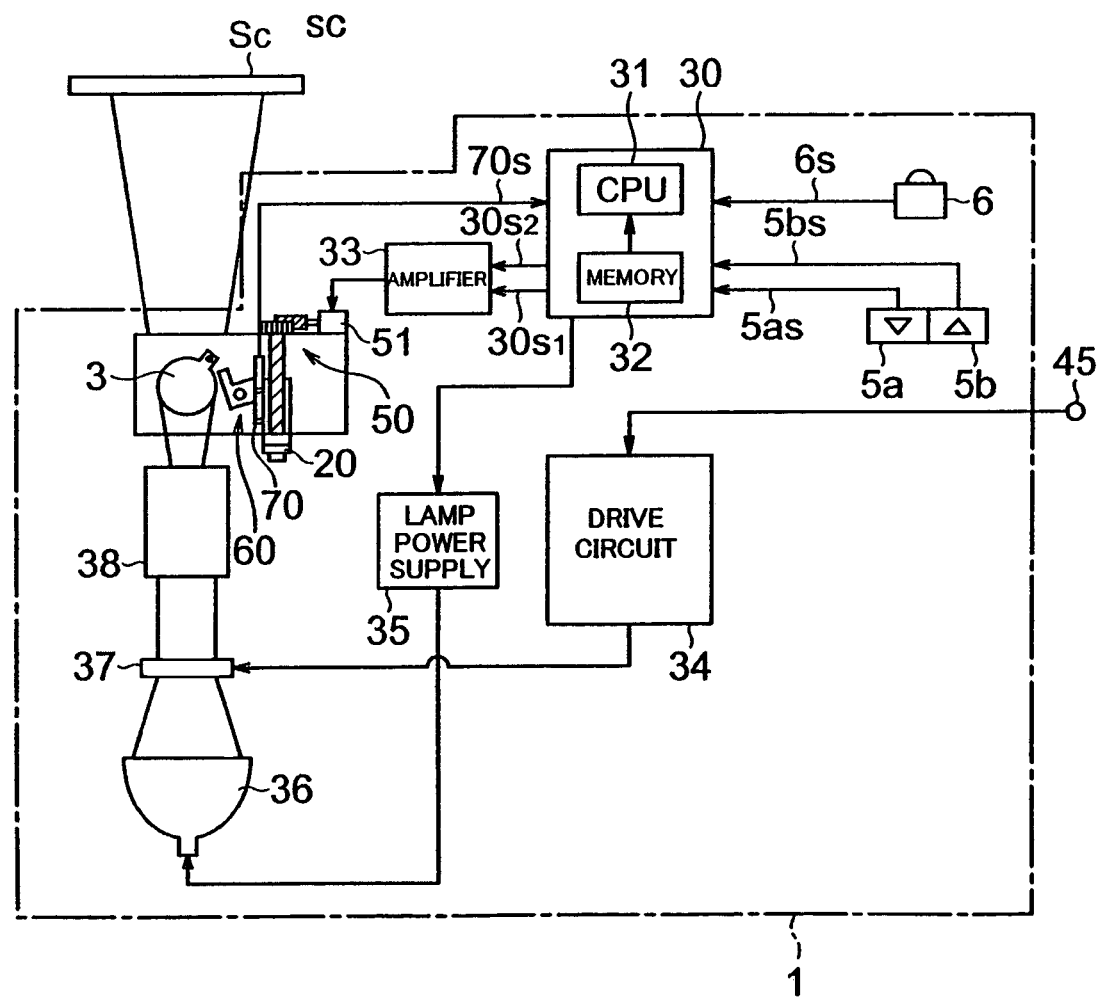
FIG. 4 is a view of a schematic configuration of an inside of an image projection apparatus.

FIG. 4 is a view of the schematic configuration of the inside of the image projection apparatus 1.

As shown in FIG. 4, the image projection apparatus 1 has a control device 30, an amplifier circuit 33, an electric motor 51, a drive circuit 34, a lamp power supply 35, a lamp 36, an LCD panel 37, a projection lens 38, an adjuster mechanism 50, a linkage mechanism 60 linking with the adjuster mechanism 50, and a position detector 70.

The drive circuit 34 receives a video signal from an input terminal 45 and drives the LCD panel 37 based on this video signal.

The LCD panel 37 acts as a video signal modulating means for generating an image to be projected onto the screen SC and making it incident upon the projection lens 38.

The lamp 36 outputs light for projecting the image generated at the LCD panel 37 via the projection lens 38 onto the screen SC.

The lamp power supply 35 supplies electric power to the lamp 36 in accordance with the control signal from the control device 30.

The projection lens 38 magnifies and emits the light from the lamp 36 modulated by the LCD panel 37 based on the video signal and focuses it on the screen SC. The opening/closing plate 3 described above is arranged at the projection opening 2h portion of the front surface of this projection lens 38. When a video image is not projected from the projection lens 38, the opening/closing plate 3 closes the projection opening 2ha and covers the front surface of the projection lens 38 to protect the projection lens 38 from scratches, dirt, etc.

The position detector 70 detects the position of the projecting member 20 as will be explained later. As this position detector 70, use is made of for example a slide type potentiometer.

The control device 30 has a processor 31 having a CPU and a memory 32. The processor 31 performs various operations and the memory 32 stores various data.

The control device 30 receives as input a detection signal 70s of the position detector 70, an on/off signal 6s from the power switch 6, and instruction signals 5as and 5bs of the operation buttons 5a and 5b and performs the on/off control of the lamp power supply 35 and the drive control of the electric motor 51 based on the input signals.

Concretely, the control device 30 outputs a signal for operating the lamp power supply 35 to the related lamp power supply 35 where the on/off signal 6s from the power switch 6 is in the on state, and while outputs a signal for turning off the lamp power supply 35 to the related lamp power supply 35 where the on/off signal 6s is in the off state.

Further, when driving the adjuster mechanism 50 in accordance with the operation of the elevation instruction buttons 5a and 5b, the control device 30 outputs an instruction 30s1 for driving the electric motor 51 and an instruction 30s2 for defining the rotation direction to the amplifier circuit 33. Namely, the electric motor 51 can rotate forward or reverse and further can rotate at a rotation speed in accordance with the magnitude of the drive instruction 30s1. The rotation direction of the electric motor 51 defines the elevation direction of the projecting member 20, while the rotation speed of the electric motor 51 defines the elevation speed of the projecting member 20.

Note that the control device 30, the amplifier circuit 33, and the electric motor 51 constitute the drive control means of the present invention. However, the memory in the control device 30 constitutes the storage means of the present invention.

The amplifier circuit 33 applies a predetermined voltage having an orientation in accordance with the instruction 30s2 to the electric motor 51 when for example the instruction 30s1 is at a low level and does not apply voltage to the electric motor 51 when the instruction 30s1 is at a high level.

Figure 5:
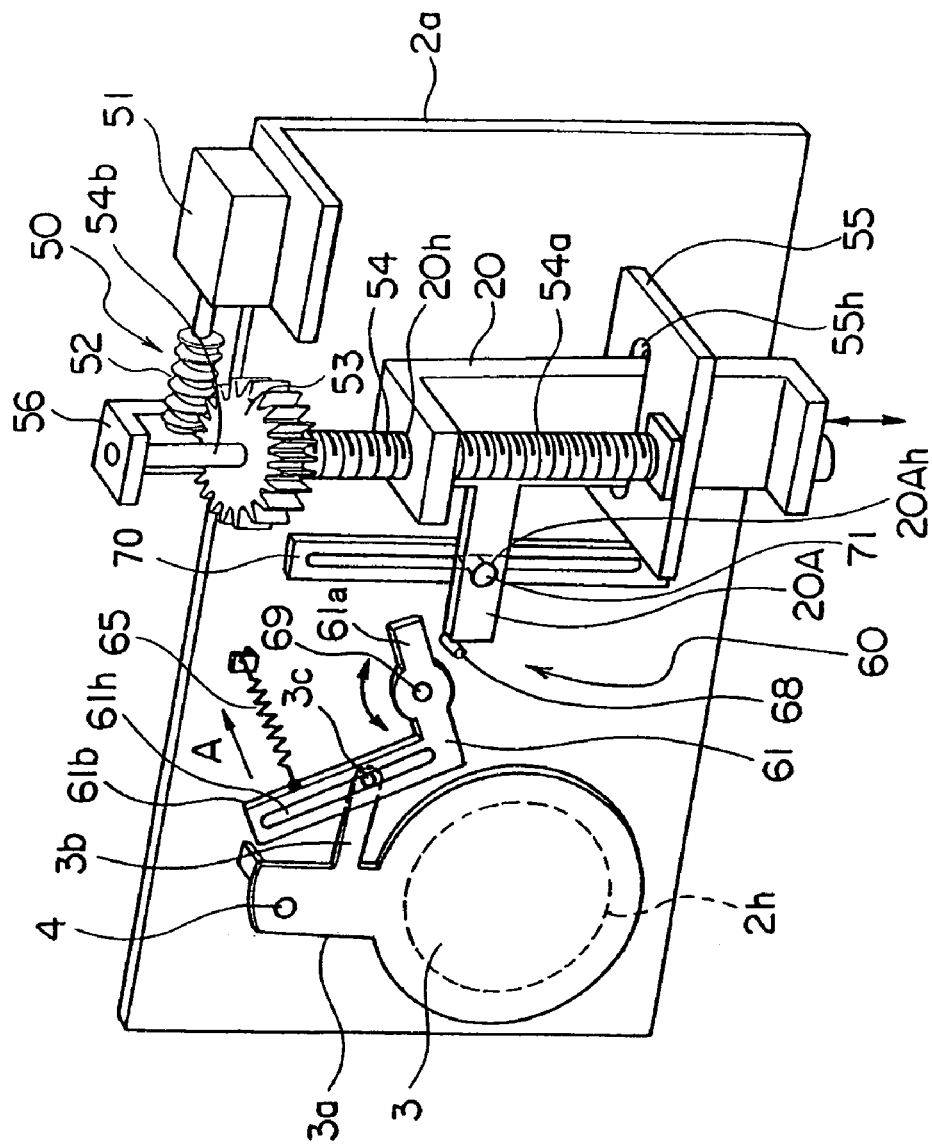
FIG. 5 is a perspective view of the structure of a movement mechanism and a linkage mechanism.

FIG. 5 is a perspective view of the structure of the adjuster mechanism 50 and the linkage mechanism 60 linking with the adjuster mechanism 50.

As shown in FIG. 5, the adjuster mechanism 50 has a projecting member 20, a worm gear 52, a gear 53, and a screw shaft 54.

The worm gear 52 is connected to the output shaft of the electric motor 51 affixed in the case 2.

The gear 53 is meshed with the worm gear 52. The center portion of this gear 53 is inserted in the shaft 54b of the upper end side of the screw shaft 54, while the gear 53 is fixed to the shaft 54b.

The screw shaft 54 is provided with a thread part 54a having a thread formed on its outer circumference, the front end of the shaft 54b of this screw shaft 54 is rotatably supported by the support member 56 fixed in the case 2, and the lower end of the screw shaft 54 is rotatably supported at the support plate 55 fixed in the case 2.

The projecting member 20 has upper and lower ends which are bent. A screw hole 20h in which the thread part 54a of the screw shaft 54 is fitted is formed in the upper side bent portion.

Further, the projecting member 20 is moveably inserted into a guide hole 55h formed in the support plate 55 and guided in the elevation direction by this guide hole 55h.

The projecting member 20 is provided with an arm 20A. The moveable portion 71 of the position detector 70 is inserted in an engagement hole 20Ah formed in this arm 20A.

The position detector 70 is for example a slide type potentiometer and outputs a voltage signal in accordance with the position of the moveable portion 71 to the control device 30.

The linkage mechanism 60 linked with the adjuster mechanism 50 is constituted by a link member 61, an arm 20A of the projecting member 20, an arm 3b formed at the opening/closing plate 3, and a resilient member 65.

The link member 61 is rotatably supported about the support shaft 69 fixed in the case 2. This link member 61 has an abutment 61a located on one side of the support shaft 69 and abutting against the tip end of the arm 20A of the projecting member 20 and a linkage 61b located on the other side of the support shaft 69 and linked with the arm 3b of the opening/closing plate 3.

The linkage 61b is formed with a long hole portion 61h into which a pin 3c provided on the arm 3b of the opening/closing plate 3 is moveably inserted.

Further, the abutment 61a of the link member 61 abuts against a stopper 68 fixed in the case 2. The rotation is defined at the abutment position.

The resilient member 65 links the linkage 61b of the link member 61 and the case 2 and biases the link member 61 in the direction of an arrow shown in FIG. 5. As the resilient member 65, use is made of for example a coil spring.

The opening/closing plate 3 has a holder 3a. This holder 3a is rotatably held about the support shaft 4 fixed in the case 2.

The holder 3a of the opening/closing plate 3 is formed with the arm 3b moveably linked with the linkage 61b of the link member 61.

In the adjuster mechanism 50, when the electric motor 51 rotates, the worm gear 52 rotates, whereby the gear 53 and the screw shaft 54 rotate.

When the screw shaft 54 rotates, the projecting member 20 moves in the axial direction of the screw shaft 54 in accordance with the rotation direction of the screw shaft 54. Accordingly, the projecting member 20 moves upward or downward by the rotation operation of the electric motor 51.

Figure 6A:
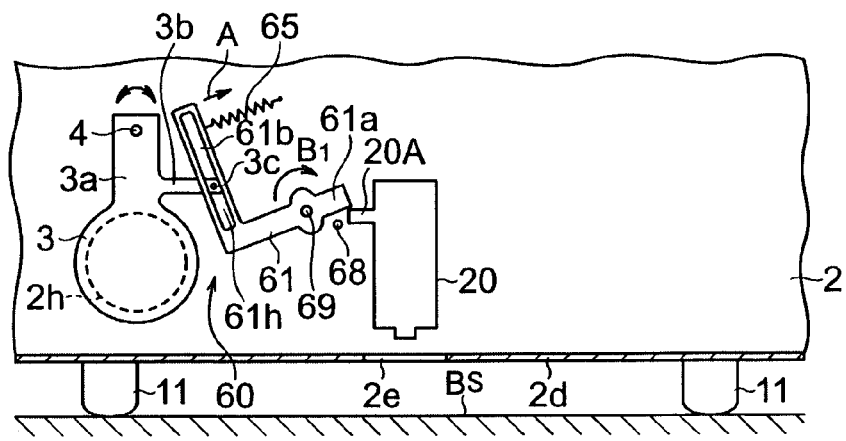
FIG. 6 is a view for explaining the operation of the linkage mechanism.
Figure 6B:
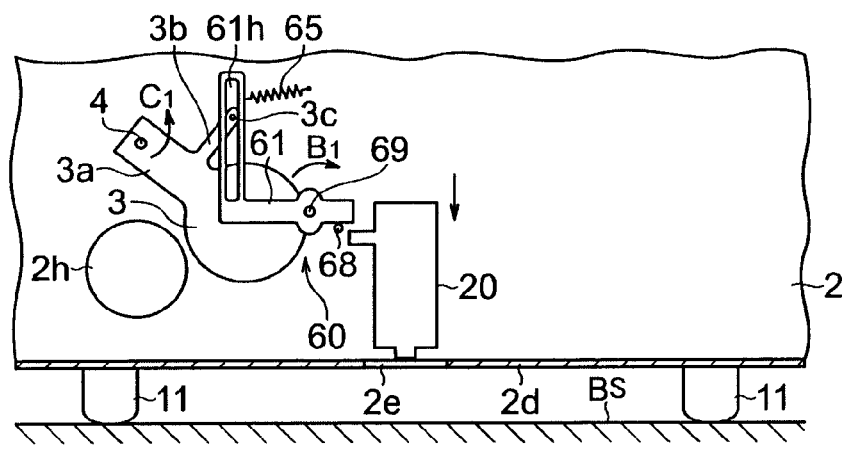
Figure 6C:
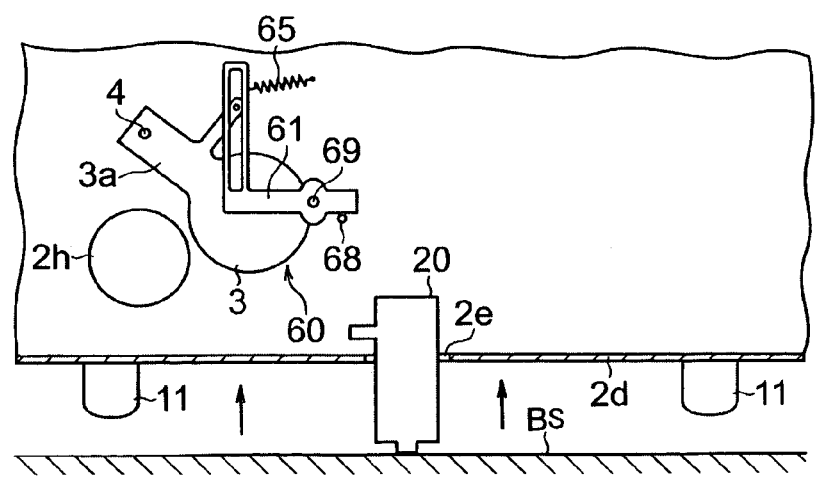

FIG. 6A to FIG. 6C are views for explaining the operation of the linkage mechanism 60.

FIG. 6A shows a state where the projecting member 20 is accommodated in the case 2 and at the predetermined storage position (the first position of the present invention).

In this state, the arm 20A of the projecting member 20 abuts against the abutment 61a of the link member 61. The link member 61 tries to rotate about the support shaft 69 in the direction of an arrow B1 by a biasing force of the resilient member 65, but the resilient force of the resilient member 65 is suppressed by the arm 20A, whereby the rotation is limited.

In the state shown in FIG. 6A, after the power switch 6 is turned on and power is supplied, when the elevation instruction button 5b is pushed down to give the instruction "raise the elevation angle", the control device 30 drives the electric motor 51 and moves the projecting member 20 downward as shown in FIG. 6B. Along with the downward movement of the arm 20A of the projecting member 20, the engagement of the arm 20A and the abutment 61a of the link member 61 is released, and the link member 61 starts the rotation above the support shaft 69 in the direction of the arrow B1 by the biasing force of the resilient member 65.

When the link member 61 rotates, the linkage 61b of the link member 61 and the arm 3b of the opening/closing plate 3 are connected, so the opening/closing plate 3 rotates about the support shaft 4 in the direction of an arrow C1. At this time, the pin 3c of the arm 3b of the opening/closing plate 3 moves in the long hole portion 61h of the linkage 61b of the link member 61.

By the rotation of the opening/closing plate 3 about the support shaft 4, the projection opening 2h closed by the opening/closing plate 3 is opened, and the projection lens 38 faces the projection opening 2h.

The link member 61 rotates about the support shaft 69 in the direction of the arrow B1 by the biasing force of the resilient member 65, but, as shown in FIG. 6B, stops at a position where the abutment 61a of the link member 61 abuts against the stopper 68. For this reason, the posture of the link member 61 and the opening/closing plate 3 is maintained in the state shown in FIG. 6B. In this state, the case 2 is located parallel to the base BS (elevation angle θ=0). Since the projection opening 2h is opened, the projection image can be projected onto the screen SC in the state where the elevation angle θ=0.

During the period where the user operates the elevation instruction button 5a to instruct to move the projecting member 20 upward in the direction enlarging the elevation angle, the control device 30 drives the electric motor 51 during the period where the elevation instruction button 5a is depressed. When the projecting member 20 is further moved downward, the lower end side of the projecting member 20 projects from an opening 2e formed in the bottom surface 2d of the case 2. After the lower end of the projecting member 20 reaches the base BS, when it further continues to move downward, as shown in FIG. 6C, the front surface 2a side of the case 2 is pushed up, and the support member 11 moves away from the base BS.

By adjusting the position of the projecting member 20 up and down by the elevation instruction buttons 5a and 5b, the inclination angle (elevation angle θ) of the case 2 can be adjusted.

Next, an explanation will be given of an example of the series of operations from turning on the power of the image projection apparatus 1 having the above configuration to shutting off the power supply with reference to FIG. 7.

Figure 7:
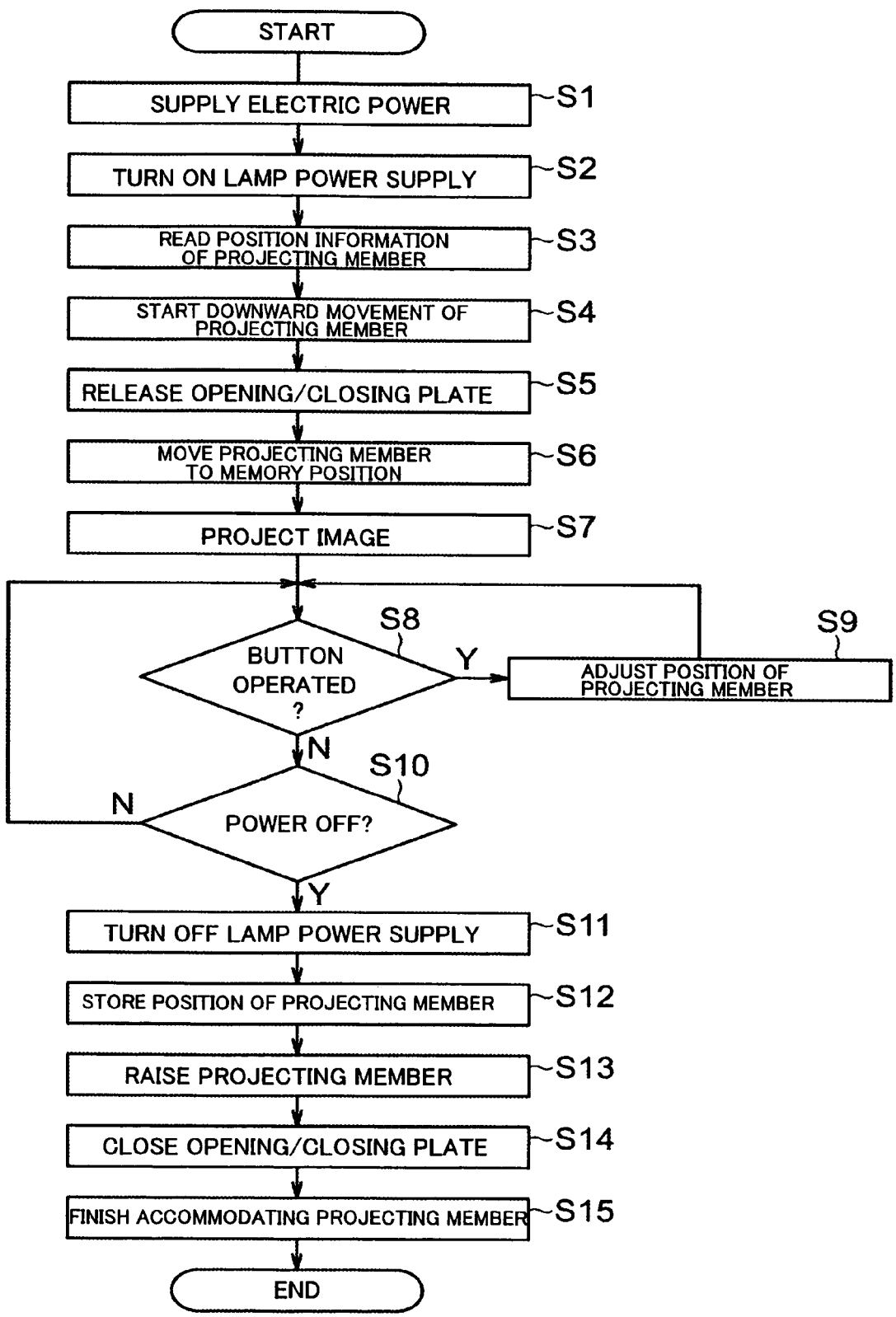
FIG. 7 is a flow chart of an example of a series of operations from turning on power of the image projection apparatus to shutting off the power.

FIG. 7 is a flow chart of an example of the series of operations from turning on the power of the image projection apparatus 1 to shutting off the power.

First, the power switch 6 provided on the upper surface 2b of the case 2 is operated to supply electric power to the image projection apparatus 1 (step S1).

The control device 30 activates the lamp power supply 35 when the on signal 6s is input from the power switch 6 (step S2).

Further, the processor 31 of the control device 30 reads the position information of the projecting member 20 stored in the memory 32 (step S3). Note that the position information of the projecting member 20 stored in the memory 32 is the position information of the projecting member 20 detected by the position detector 70 at the previous shut off of the power.

The control device 30 outputs the instruction 30s1 for driving the electric motor 51 and the instruction 30s2 for defining the rotation direction to the amplifier circuit 33 based on the read position information of the projecting member 20.

By this, the projecting member 20 starts downward movement from the predetermined storage position (step S4).

Note that the control device 30 acquires the position information of the projecting member 20 successively changing according to the downward movement of the projecting member 20.

By the downward movement of the projecting member 20, the linkage mechanism 60 operates, whereby the opening/closing plate 3 rotates about the support shaft 4 and the projection opening 2h is opened (step S5). By this, it becomes possible to project an image from the projection lens 38 through the projection opening 2h.

The control device 30 moves the projecting member 20 until the position information of the projecting member 20 detected by the position detector 70 and the position of the projecting member 20 stored in the memory 32 match (step S6).

When the projecting member 20 projected from the bottom surface 2d of the case 2 at the previous shut off of the power, the projecting member 20 projects again from the bottom surface 2d of the case 2, whereby the case 2 is inclined so as to give an elevation angle θ the same as that of the previous time.

After the movement of the projecting member 20 stops, when a video signal is applied from the input terminal 45 to the LCD panel 37 via the drive circuit 34, the image modulated and generated by the LCD panel 37 is projected to the screen SC (step S7).

In this state, in order to adjust the height of the image projected on the screen SC, the control device 30 decides if the elevation instruction buttons 5a and 5b for instructing upward movement or downward movement of the projecting member 20 (or the rising or lowering of the elevation angle) were operated (step S8). When the operation buttons 5a and 5b were operated, and the instruction signals 5as and 5bs are input to the control device 30. The control device 30 elevates the projecting member 20 based on these instruction signals 5as and 5bs to adjust of the elevation amount of the projecting member 20 (step S9). By this, the height of the image on the screen SC is adjusted.

When the power switch 6 is operated and the off signal 6s is input from the power switch 6, the control device 30 stops the lamp power supply 35 (step S11).

Further, the control device 30 acquires the present position of the projecting member 20 from the position detector 70 and newly stores this position information in the memory 32 (step S12).

After storing the position of the projecting member 20 in the memory 32, the control device 30 reads the information of the storage position of the projecting member 20 stored in the memory 32 and outputs the instruction 30s1 for driving the electric motor 51 and the instruction 30s2 for defining the rotation direction to the amplifier circuit 33 based on the read position information.

By this, the projecting member 20 moves upward toward the predetermined storage position (step S13).

In the middle of movement of the projecting member 20 toward the predetermined storage position, the arm 20A of the projecting member 20 abuts against the abutment 61a of the link member 61 again, whereby the linkage mechanism 60 operates. By this, the opening/closing plate 3 rotates about the support shaft 4 in the direction closing the projection opening 2h, whereby the projection opening 2h is closed again (step S14).

When the projecting member 20 reaches the predetermined storage position, the storage of the projecting member 20 is completed (step S15).

As described above, according to the present embodiment, when electric power is supplied to the image projection apparatus 1, the projecting member 20 for adjusting the elevation angle θ of the image projection apparatus 1 is automatically returned to the position where the power was shut off the previous time and, at the same time, the opening/closing plate 3 covering the front surface of the projection lens 38 is opened by utilizing the movement of the projecting member 20. By this, preparatory work for projecting an image by the image projection apparatus 1 is automatically carried out, and the time and procedures required for the preparation work whenever the image projection apparatus 1 is used are much reduced.

Further, when shutting off the power to the image projection apparatus 1, by automatically storing the projecting member 20 at the predetermined storage position in the case 2 and, at the same time, automatically closing the opening/closing plate 3, the time and procedures required for the storage work are again greatly reduced.

Note that, the present invention is not limited to the above embodiment.

The above embodiment was configured to open or close the projection opening 2h by rotating the opening/closing plate 3 about the support shaft 4, but it is also possible to employ a configuration wherein the opening/closing plate is slidably provided to open and close the projection opening 2h.

Further, the case where power is transmitted from the electric motor 51 to the projecting member 20 by using a transmission mechanism comprising the worm gear 52, the gear 53, and the screw shaft 54 was exemplified, but it is also possible not to use the worm gear 52, but use a gear train comprising spur gears.

Further, in the above embodiment, the elevation instruction buttons 5a and 5b were arranged on the top surface of the case 2, but it is also possible to employ a constitution wherein they are arranged on the back surface opposite to the front surface 2a of the case 2. This is because, the back surface of the case 2 is also near the shaft S, and the position almost never fluctuates due to inclination. In this case, by using a so-called seesaw switch able to change in posture in accordance with the inclination of the case 2 as the elevation instruction buttons 5a and 5b, the operability is further improved.

Further, in the above embodiment, when the off signal 6s is input from the power switch 6, the control device 30 operated to acquire the present position of the projecting member 20 from the position detector 70 and newly store this position information in the memory 32, but it is also possible to employ a constitution, for example, storing the position information of the projecting member 20 when operating the elevation instruction buttons 5a and 5b to incline the image projection apparatus 1 to the desired elevation angle in the memory 32 and storing the present position information of the projecting member 20 in the memory 32 before the off signal 6s is input from the power switch 6. Alternatively, it is also possible to store the information setting the elevation angle desired by the user or the position of the projecting member 20 in the memory 32.

Note that a formula or table indicating the relationship between the elevation angle and the height position of the projecting member 20 can be stored in the memory of the control device 30. Accordingly, it is also possible to set it as the elevation angle or set it as the height position (elevation position) of the projecting member 20.

At the time of restart of the image projection apparatus 1, the control device 30 controls the drive of the adjuster mechanism 50 so as to obtain the elevation angle or the elevation position of the projecting member 20 held in the memory 32 with reference to the detected value of the position detector 70.

The above description was made of the example wherein the adjuster mechanism 50 and the linkage mechanism 60 for operating the opening/closing plate for opening or closing the projection opening were linked as a preferred embodiment of the present invention, but it is also possible to operate only the adjuster mechanism 50.

Note that while an example using an LCD unit as the means for projecting the image to the projection lens was explained above, the image projection apparatus of the present invention is not limited to the case where the LCD unit is used so far as it is an apparatus of providing an image to the projection lens.

Further, in the image projection apparatus of the present invention, as mentioned above, the position where the projecting member 20 serving as the elevation member was completely contained in the case 2 was determined as the first position, that is, the storage position was determined as the first position, but the first position of the present invention may also be a position where the projecting member 20 is not contained in the case 2 in its entirety, but is partially exposed to the outside of the case 2 so long as the lower end of the projecting member 20 does not abut against the base BS corresponding to the setting surface of the present invention, and does not generate elevation angle. The second position of the present invention means the position where the lower end of the projecting member 20 serving as the elevation member abuts against the base BS and starts the generation of the elevation angle, while the third position of the present invention means the position where the projecting member 20 projects so that the elevation angle becomes further larger from the second position.

According to the present invention, an image projection apparatus which can easily adjust the position of an image for projecting the image onto the screen and also can easily return the elevation member of the present invention (projecting member of the adjuster mechanism) to the first position (return position) is provided.

INDUSTRIAL APPLICABILITY

The present invention can be applied to for example various image projection apparatuses.

1 . . . image projection apparatus
2 . . . case
2h . . . projection opening
3 . . . opening/closing plate
4 . . . support shaft
5a, 5b . . . operation switches
6 . . . power switch
11, 12 . . . support member
20 . . . projecting member
30 . . . control device
33 . . . amplifier circuit
34 . . . drive circuit
35 . . . lamp power supply
36 . . . lamp
37 . . . liquid crystal panel
38 . . . projection lens
SC . . . screen

The invention claimed is:

1. An image projection apparatus comprising:
a case having a projection opening at a first side;
a projection lens contained in said case and projecting an image through the projection opening of said case;
an adjuster means having an elevation member, lifting said elevation member from a first position where a lower end of the elevation member does not contact a setting surface of the bottom of said case, through a second position where the lower end of said elevation member contacts the setting surface of said case and raises a first side of said case by using a bottom of said case on a second side facing the first side of said case as a fulcrum and starts generation of an elevation angle, to a third position for further enlarging the elevation angle over that of said second position, and adjusting the elevation angle of said projection lens in accordance with this elevation;
a drive control means for controlling the drive of said adjuster means;
an opening/closing member located at a front surface of said projection lens for opening or closing said projection opening; and
a linkage means operating linked with said adjuster means to move said opening/closing member so as to open said projection opening during a period where said elevation member is moved from said first position to said third position by said drive control means to move said opening/closing member so as to close said projection opening when said elevation member returns from said third position to said first position.

2. An image projection apparatus as set forth in claim 1, wherein said linkage means moves said opening/closing member to open said projection opening when said elevation member moves from said first position to said second position and moves said opening/closing ember to close said projection opening when said elevation member returns from said second position to said first position.

3. An image projection apparatus as set forth in claim 1, wherein
said apparatus further has elevation instruction buttons for instructing elevation of said elevation member, and
said drive control means controls the drive of said adjuster means to elevate said elevation member in accordance with operation of said elevation instruction buttons during said operation.

4. An image projection apparatus as set forth in claim 3, wherein said elevation instruction buttons are provided at a top surface or side surface of said case at the second side of said case near said fulcrum.

5. An image projection apparatus as set forth in claim 4, further comprising a switch provided in the vicinity of said elevation instruction buttons for turning the power of said image projection apparatus on and off.

6. An image projection apparatus as set forth in claim 1, wherein:
said drive control means comprises
a motor and
a screw means for elevating said elevation member in accordance with rotation of said motor, and
said linkage means has
an elastic member biasing said opening/closing member to a side closing or opening said projection opening, and
a link means engaging with a projection of said elevation member to suppress movement of said opening/closing member against the elastic force of said elastic member when said elevation member is positioned at said first position and disengaging with said projection of said elevation member to make said opening/closing member move by the elastic force of said elastic member to open or close said projection opening when said elevation member moves from said first position to said second position.

7. An image projection apparatus as set forth in claim 1, wherein said apparatus further comprises:
a position detecting means for detecting an elevation position of said elevating means, and
a storage means for storing a setting of an elevation angle or a setting of an elevation position of said elevation member or an adjusted elevation angle or elevation position of said elevation member, and
wherein said drive control means controls the drive of said adjuster mechanism with reference to a detected value of said position detecting means so as to give the set elevation angle or set elevation position stored in said storage means when restarting said image projection apparatus.

8. An image projection apparatus as set forth in claim 7, wherein said drive control means returns said elevation member of said adjuster means to said first position and closes said projection opening by said opening/closing member when power off.

9. An image projection apparatus as set forth in claim 1, wherein said drive control means returns said elevation member of said adjuster means to said first position and closes said projection opening by said opening/closing member when power is turned off.

10. An image projection apparatus as set forth in claim 1, wherein said apparatus further comprises
a position detecting means for detecting an elevation position of said elevating means, and
a storage means for holding a detected value of said position detecting means right before the power of said image projection apparatus was turned off, and
wherein said drive control means refers to a detected value of said position detecting means and adjusts the position of said elevation member to the position stored in said storage means when power of said image projection apparatus is turned on again.

11. An image projection apparatus as set forth in claim 1, wherein said apparatus further comprises a video modulating means for modulating a video signal to generate an image and make it strike said projection leans, and wherein said drive control means turns on the power of said video modulating means when power is turned on by said power switch and cuts off the power of said video modulating means when the power is turned off.

12. An image projection apparatus comprising:

a case having a projection opening at a first side;

a projection lens contained in said case and projecting an image through the projection opening of said case;

an adjuster means having an elevation member, lifting said elevation member from a first position where a lower end of the elevation member does not contact a setting surface of the bottom of said case, through a second position where the lower end of said elevation member contacts the setting surface of said case and raises a first side of said case by using a bottom of said case on a second side facing the first side of said case as a fulcrum and starts generation of an elevation angle, to a third position for further enlarging the elevation angle exceeding that of the second position and adjusting the elevation angle of said projection lens in accordance with this elevation;

a drive control means for controlling the drive of said adjuster means; and elevation instruction buttons provided on a top surface or a side surface of said case at a second side of said case in the vicinity of said fulcrum and instructing elevation of said elevation member.

13. An image projection apparatus as set forth in claim 12, further having a switch provided in the vicinity of said elevation instruction buttons for turning the power of said image projection apparatus on and off.

\* \* \* \* \*